(12) United States Patent
Rotole et al.

(10) Patent No.: US 10,772,257 B2
(45) Date of Patent: Sep. 15, 2020

(54) MULTI MODE CROP FORMING SHIELD ADJUSTMENT MECHANISM

(71) Applicant: DEERE & COMPANY, Moline, IL (US)

(72) Inventors: David V. Rotole, Bloomfield, IA (US); Ethan C. Conrad, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 293 days.

(21) Appl. No.: 15/894,373

(22) Filed: Feb. 12, 2018

(65) Prior Publication Data

US 2018/0325024 A1 Nov. 15, 2018

Related U.S. Application Data

(60) Provisional application No. 62/505,366, filed on May 12, 2017.

(51) Int. Cl.
| | |
|---|---|
| *A01D 34/49* | (2006.01) |
| *A01D 34/00* | (2006.01) |
| *A01D 34/43* | (2006.01) |
| *A01D 43/10* | (2006.01) |
| *A01D 57/26* | (2006.01) |
| *A01D 57/24* | (2006.01) |
| A01D 101/00 | (2006.01) |

(52) U.S. Cl.
CPC ............ *A01D 34/49* (2013.01); *A01D 34/006* (2013.01); *A01D 34/43* (2013.01); *A01D 43/10* (2013.01); *A01D 57/24* (2013.01); *A01D 57/26* (2013.01); *A01D 2101/00* (2013.01)

(58) Field of Classification Search
CPC .. A01D 41/1243; A01D 57/28; A01D 34/667; A01D 34/49; A01D 57/24; A01D 57/2643; A01D 34/43; A01D 34/006; Y10S 460/901
See application file for complete search history.

(56) References Cited

U.S. PATENT DOCUMENTS

| | | | | |
|---|---|---|---|---|
| 3,523,410 | A | * 8/1970 | Taylor | A01D 43/105 56/10.2 R |
| 3,683,602 | A | * 8/1972 | Scarnato | A01D 43/107 56/14.4 |
| 3,841,070 | A | 10/1974 | Scarnato | |

(Continued)

FOREIGN PATENT DOCUMENTS

| | | |
|---|---|---|
| DE | 19736978 A1 | 3/1999 |
| EP | 1008290 A1 | 6/2000 |
| NL | 1008026 C2 | 7/1999 |

OTHER PUBLICATIONS

European Patent Office, Munich Germany; EP Search Report; dated Nov. 12, 2018; pp. 1-9.

*Primary Examiner* — Arpad Fabian-Kovacs
(74) *Attorney, Agent, or Firm* — Taft Stettinius & Hollister LLP; Stephen F. Rost

(57) ABSTRACT

A crop forming assembly having a top plate with a first side and a second side, an arc-shaped cutout defined through the top plate, a forming shield pivotally coupled to the top plate and positioned on the second side, and a motor removably coupled to the top plate and configured to engage the forming shield. Wherein, the motor engages the forming shield to reposition the forming shield along the arc-shaped cutout.

20 Claims, 13 Drawing Sheets

(56) References Cited

U.S. PATENT DOCUMENTS

| | | | | |
|---|---|---|---|---|
| 3,881,301 | A * | 5/1975 | Sawyer | A01D 43/107 56/14.4 |
| 3,911,649 | A * | 10/1975 | Scarnato | A01D 57/28 56/1 |
| 4,099,364 | A * | 7/1978 | Kanengieter | A01D 43/10 56/16.4 C |
| 4,991,383 | A * | 2/1991 | Ermarcora | A01D 67/00 56/14.9 |
| 5,778,647 | A * | 7/1998 | McLean | A01D 34/664 56/13.6 |
| 5,930,988 | A | 8/1999 | Hansen | |
| 6,854,251 | B2 * | 2/2005 | Snider | A01D 82/00 56/192 |
| 8,464,508 | B2 * | 6/2013 | Matousek | A01D 43/006 280/400 |
| 8,925,292 | B2 * | 1/2015 | Lebeau | A01D 43/107 56/16.4 A |
| 9,386,742 | B1 * | 7/2016 | Barnett | A01B 63/22 |
| 9,565,800 | B2 * | 2/2017 | Fay, II | A01D 43/06 |
| 9,894,837 | B2 * | 2/2018 | Estock | A01D 43/06 |
| 10,070,573 | B2 * | 9/2018 | Nielsen | A01D 34/74 |
| 2006/0123764 | A1 | 6/2006 | McLean | |
| 2010/0311481 | A1 * | 12/2010 | Ritter | A01D 41/1243 460/112 |
| 2011/0023439 | A1 * | 2/2011 | Kendrick | A01D 41/1243 56/341 |
| 2011/0023440 | A1 * | 2/2011 | Matousek | A01F 15/0825 56/341 |
| 2011/0029909 | A1 * | 2/2011 | Matousek | A01F 15/10 715/771 |
| 2014/0083071 | A1 * | 3/2014 | Fay, II | A01D 34/667 56/15.6 |
| 2016/0029560 | A1 | 2/2016 | Jepersen | |
| 2016/0066509 | A1 | 3/2016 | Fay | |
| 2018/0325028 | A1 * | 11/2018 | Rotole | A01D 43/102 |

* cited by examiner

MULTI MODE CROP FORMING SHIELD ADJUSTMENT MECHANISM

CROSS REFERENCE TO RELATED APPLICATION

This Application is a continuation of U.S. Patent Application No. 62/505,366 filed on May 12, 2017 and titled "Multi Mode Crop Forming Shield Adjustment Mechanism," the disclosure of which is incorporated herein by reference in its entirety.

FIELD OF THE DISCLOSURE

The present disclosure relates to crop forming shields, and more particularly to a mechanism for adjusting the disposition of crop flow shields.

BACKGROUND

In the hay and forage industry among others, a cutting or mowing device is used to cut crop. Once the crop is mowed, the crop is allowed to dry before it is baled or otherwise collected. In this industry, it is desirable to reduce an amount of time it takes for hay or other crop to dry down, i.e., to dry or reduce moisture from the plant or crop. A faster dry down time can result in less time between cutting and baling the crop, which can minimize risk to the crop while sitting in the field.

One example of reducing dry down time is to spread the crop as wide as possible to maximize the exposure of the crop to the sun, wind, and surrounding environment. In doing so, moisture from the crop can evaporate quicker. In another example it is necessary to form the crop in a narrower row to ensure wheels of a tractor do not compress the mowed crop. Further still, forming the crop improves the efficiency of pickup for a forage harvester or the like. Forming shields, among other things, are used to modify the width of the crop windrow after it is cut.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
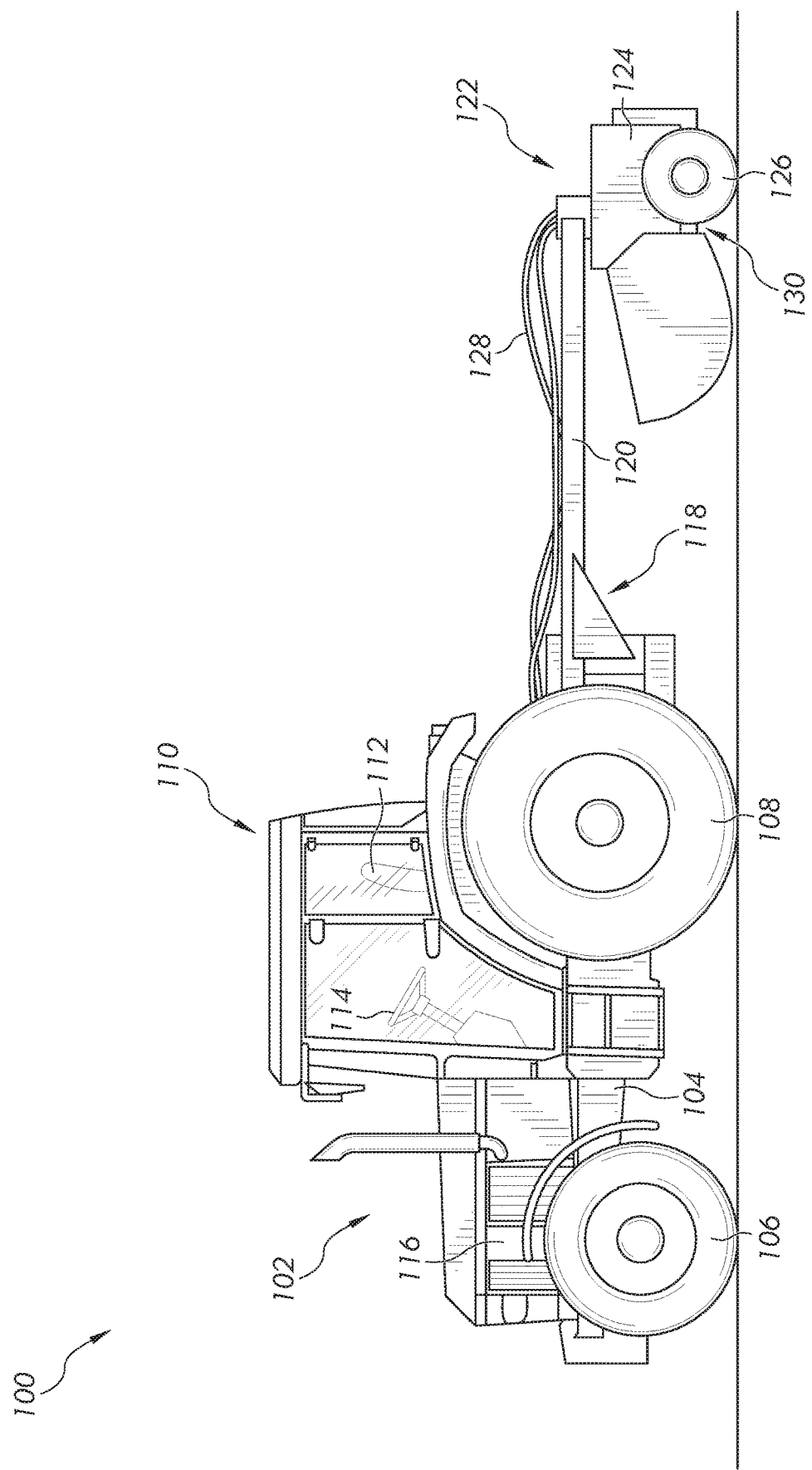
FIG. 1 is a side view of a combined tractor and mower-conditioner assembly.

Referring to FIG. 1, a combined tractor and mower assembly 100 is illustrated. A tractor 102 may be any conventional tractor that includes a frame or chassis 104, a front wheel 106 and a rear wheel 108. The tractor 102 may include a cab 110 in which an operator may be seated in an operator's seat 112. The operator may utilize a plurality of operator controls 114 for controlling the tractor 102. As shown, the controls 114 may include a steering wheel, a gear selector, a joystick, a switch, a button, a lever, or any combination thereof. The tractor 102 may further include a conventional drive system 116 such as an engine, prime mover, transmission, differential, etc. The drive system 116 may be mechanical, electrical, hydraulic, pneumatic, or any other type of drive system or combination thereof.

The tractor 102 may include a rear hitch assembly 118 to which a mower-conditioner assembly 122 may be coupled. A tongue 120 or other similar device may couple the mower-conditioner assembly 122 to the tractor 102, as shown in FIG. 1. In this manner, the tractor 102 pulls the mower-conditioner assembly 122 in a forward or drive direction. The mower-conditioner assembly 122 may include a mower or cutting mechanism such as a cutter bar, disc blades, or the like. The mowing mechanism may include a conventional disc-type cutter bar with rotating knives for cutting crop. In addition, the mower-conditioner assembly 122 may include a wheel 126 that travels along a ground surface as the mower-conditioner assembly 122 is pulled by the tractor 102. The mower-conditioner assembly 122 may also have a forming shield assembly 130 coupled thereto. Fluid lines 128 may also be provided for driving the mower-conditioner assembly 122.

In another embodiment, the mower-conditioner assembly 122 may be coupled to a three-point hitch assembly as is known by a person having skill in the art. The three-point hitch assembly may provide a power take-off that may be mechanically coupled to the mower-conditioner assembly 122. The power take-off may provide mechanical power generated by the drive system 116 of the tractor 102. In this configuration, the mower-conditioner assembly 122 may be mechanically coupled to the tractor 102 via the three-point hitch assembly while the power take-off provides mechanical power to the mower-conditioner assembly 122.

The mower-conditioner assembly 122 may also include a conditioner assembly 124 located behind or rearward of the mowing mechanism. The conditioner assembly 124 may be any conventional conditioner assembly such as a roll or impeller. Additional detail about the type of conditioner assembly is provided below with reference to FIGS. 3 and 4 of the disclosure. The conditioner assembly 124 may crimp the crop after it is cut by the mowing mechanism. Moreover, the conditioner assembly 124 may include the forming shield assembly 130 that deflects or redirects the crimped crop to form it into a uniform windrow. This can improve the dry down time of the crop.

Figure 2:
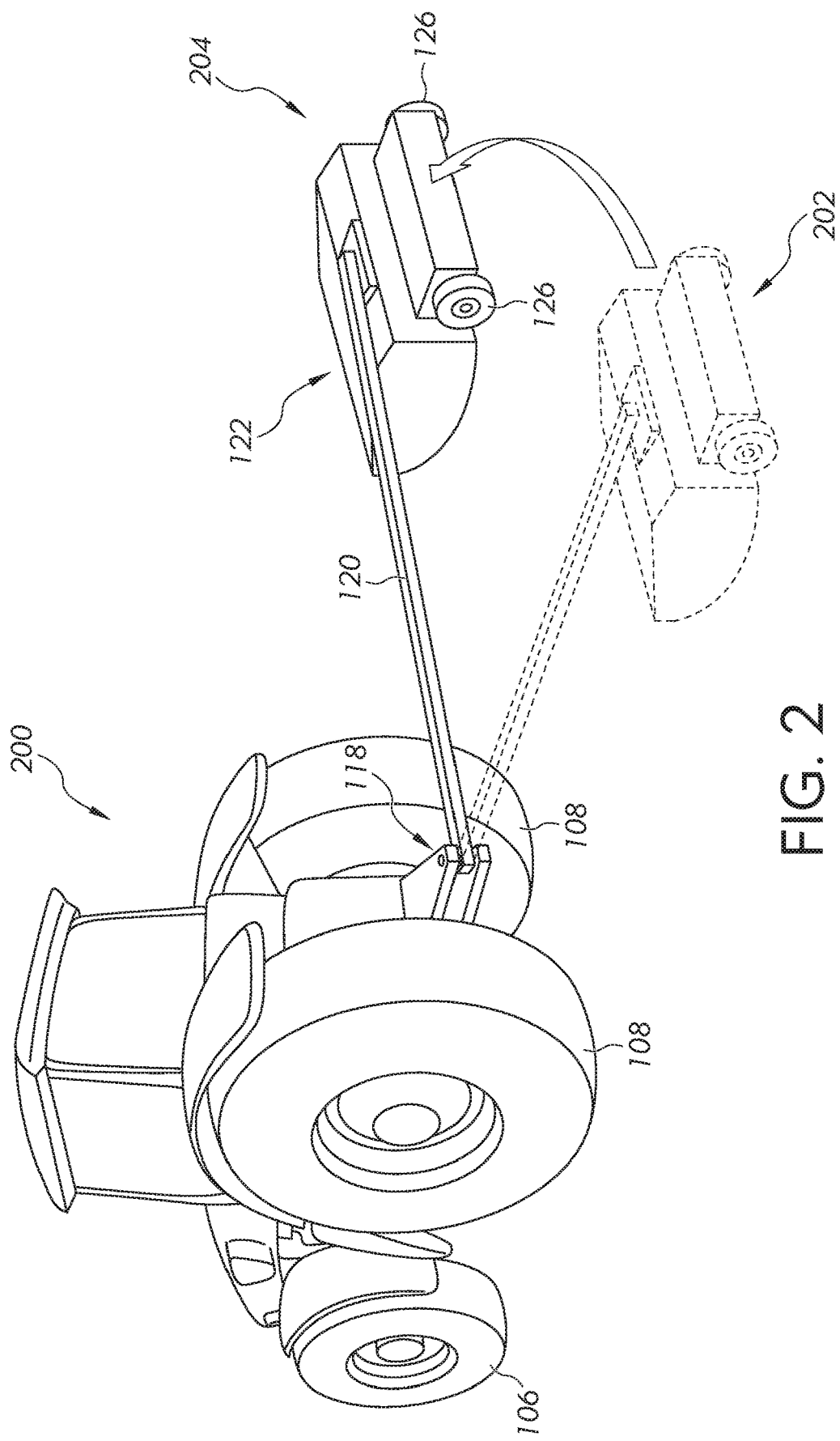
FIG. 2 is a side perspective view of another combined tractor and mower-conditioner assembly.

Referring to FIG. 2, a different embodiment of a combined tractor and mower assembly is shown. As shown, a tractor 200 may pull the mower-conditioner assembly 122 such that the mower-conditioner assembly 122 may be disposed in a first position 202 directly behind the tractor 200, or in a second position 204 at which the mower-conditioner assembly 122 is offset to one side of the tractor 200. In FIG. 2, and in particular in the second position 204, the mower-conditioner assembly 122 is shown offset to a right side of the tractor 200. In other embodiments, however, the mower-conditioner assembly 122 may be offset to the left side thereof. In this manner, the rear mount hitch 118 may allow the mower-conditioner assembly 122 to be pivotably mounted thereto.

Figure 3:
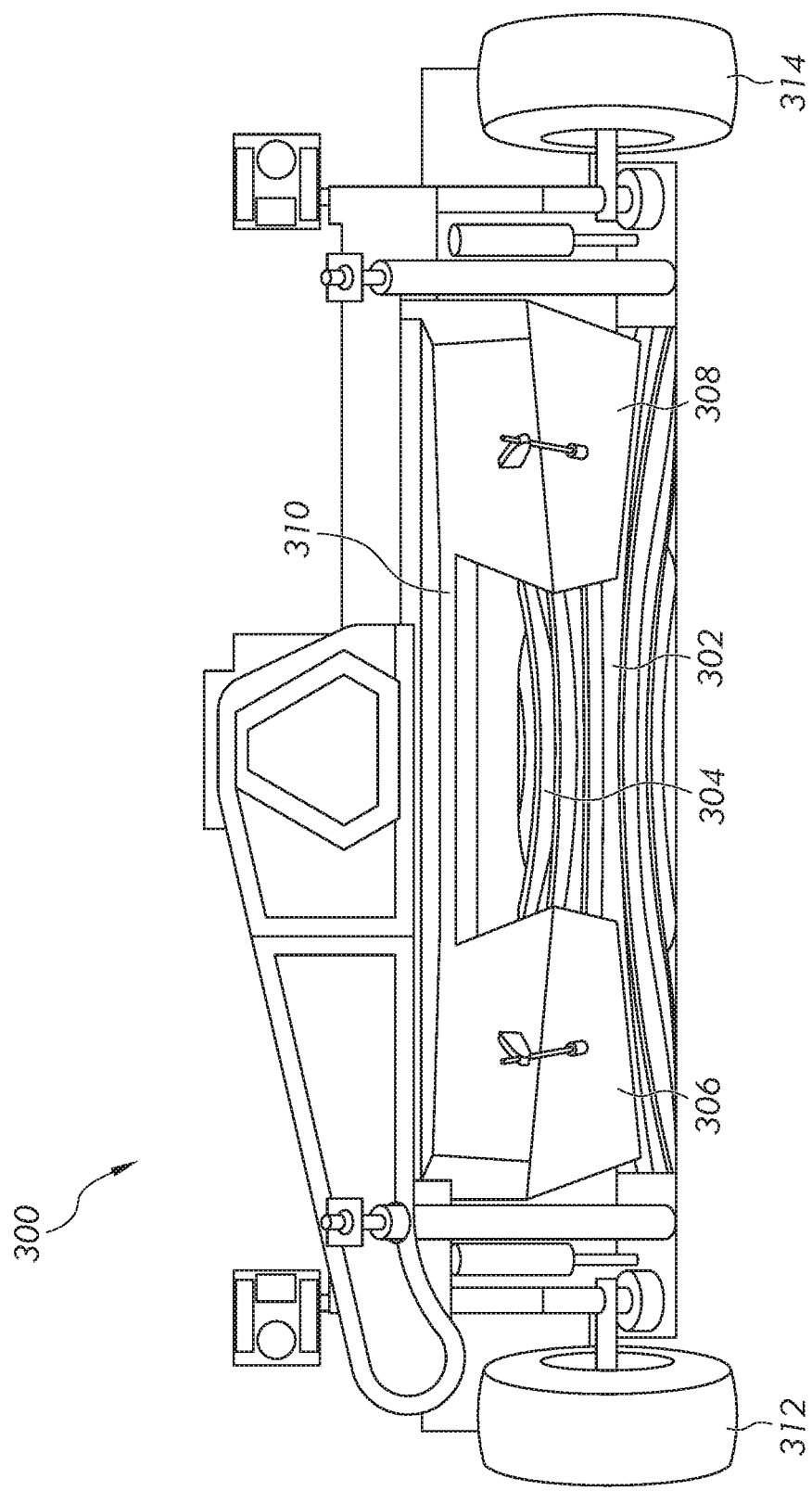
FIG. 3 is a rear view of a mower-conditioner assembly.

As described above, a conditioner assembly is provided to improve the dry down time of the crop among other things. In FIG. 3, one embodiment of a conventional conditioner assembly is illustrated. Here, the conditioner assembly 300 may include a first roll 302 and a second roll 304. A gap or space may be defined between the two rolls such that crop that is cut by the mowing mechanism passes through the gap and between the two rolls. The rolls may be formed of a urethane material, or in other embodiments the rolls may be formed of steel. Other materials may be possible, and this disclosure is not limited to any particular material. The rolls may be rotatably driven at a high rotational velocity.

The conditioner assembly 300 may include a first wheel 312 and a second wheel 314 for travelling along the ground. During operation, the cut crop may be passed rearward and directed in a desired direction by a shield. In FIG. 3, a first shield 306 or swath flap and a second shield 308 or swath flap are shown. Each shield may function as a deflector to adjust or narrow a width of the crop exiting the conditioner assembly 300. The first shield 306 and the second shield 308 may be coupled to a conditioner frame 310, and in some instances, such as the embodiment illustrated in FIG. 5, the two shields may be adjustably pivoted with respect to the frame 310 to adjust the width of the windrow. The shields may be internal to the conditioner 300, and in some embodiments, there may be one or more shields. In the embodiment of FIG. 3, a turn screw or the like may be provided to angularly adjust the shields.

Figure 4:
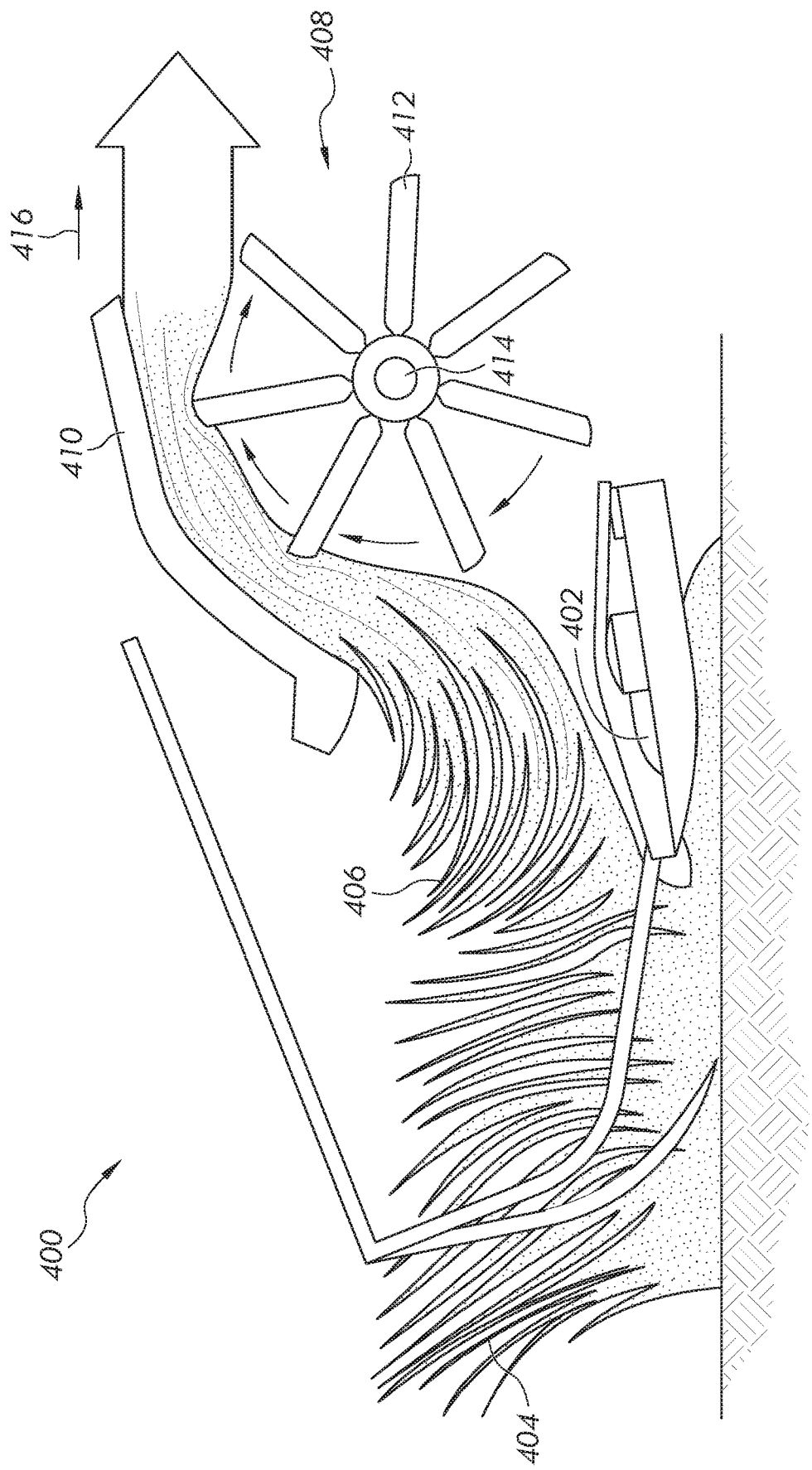
FIG. 4 is a side view schematic of an alternative mower-conditioner assembly.

In a further illustrated embodiment of FIG. 4, a second type of conditioner 400 is shown. Here, the conditioner 400 is formed by an impeller 408 having a rotation axis 414 and a plurality of tines 412. As shown, uncut crop 404 may be cut at a location near the ground by a cutter bar assembly 402. The cutter bar assembly 402 may include one or more discs with knives for cutting the crop. Once the cutter bar assembly 402 cuts the crop, the cut crop 406 passes in a rearward direction 416 toward the impeller 408. The impeller 408 may rotate about its rotation axis 414 in a clockwise direction as viewed in FIG. 4 to further move the cut crop 406 from the cutter bar assembly 402 into contact with a conditioner hood 410 or swath flap. As the crop 406 passes through, it may rub against or otherwise contact the conditioner hood 410 and other crop. In doing so, portions of the crop's waxy surface may be removed to further improve the dry down time. Although not particularly shown in FIG. 4, one embodiment of the second type of conditioner 400 may include forming shields in addition to the conditioner hood. The forming shield may be adjustable to provide a variable width of cut crop depending on the equipment being used and the condition of the field.

In one embodiment, the shields may be used to narrow the width of the crop so that during a subsequent pass, the tractor wheels do not run over the crop and damage it. This is a concern when the mower-conditioner assembly is disposed offset from the tractor, such that the mower is cutting new crop and the tractor is passing over crop that has already been cut and conditioned. Since the tractor wheels can pack the windrow into the ground and thus negatively affect the dry down time or damage the crop, it is desirable to keep the width of the windrow at least narrower than the distance between the two innermost wheels of the tractor. In doing so, the tractor can straddle the windrow as it passes over the cut crop. Different tractor configurations have different innermost wheel widths. Providing adjustable forming shields coupled to the mower-conditioner assembly 122 allows the mower-conditioner assembly 122 to be utilized by several different tractor configurations as well as providing the user more control over the windrow size and location as it exits the mower-conditioner assembly 122.

Figure 5:
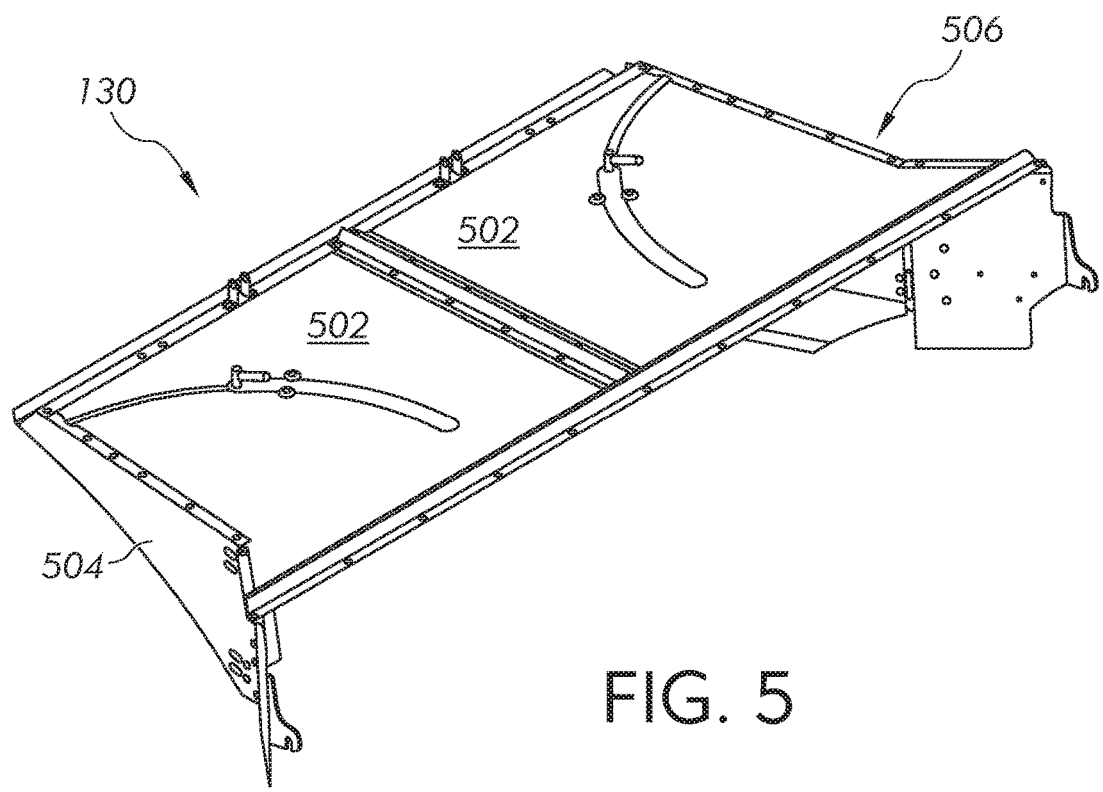
FIG. 5 is an elevated perspective view of the topside of a forming shield assembly.

Referring now to FIG. 5, one embodiment of a forming shield assembly 130 is illustrated isolated from the remaining components of the mower-conditioner assembly 122. The forming shield assembly 130 may have a frame member or top plate 502 extending between a first side 504 and a second side 506. In one aspect of this disclosure, the top plate 502, first side 504, and the second side 506 may be formed from one integral component. However, in a different embodiment, each of the top plate 502, first side 504, and second side 506 may be different components coupled to one another via welds, brackets and fasteners, or the like. The forming shield assembly 130 may be coupled to the conditioner to direct crop into corresponding windows.

Figure 6:
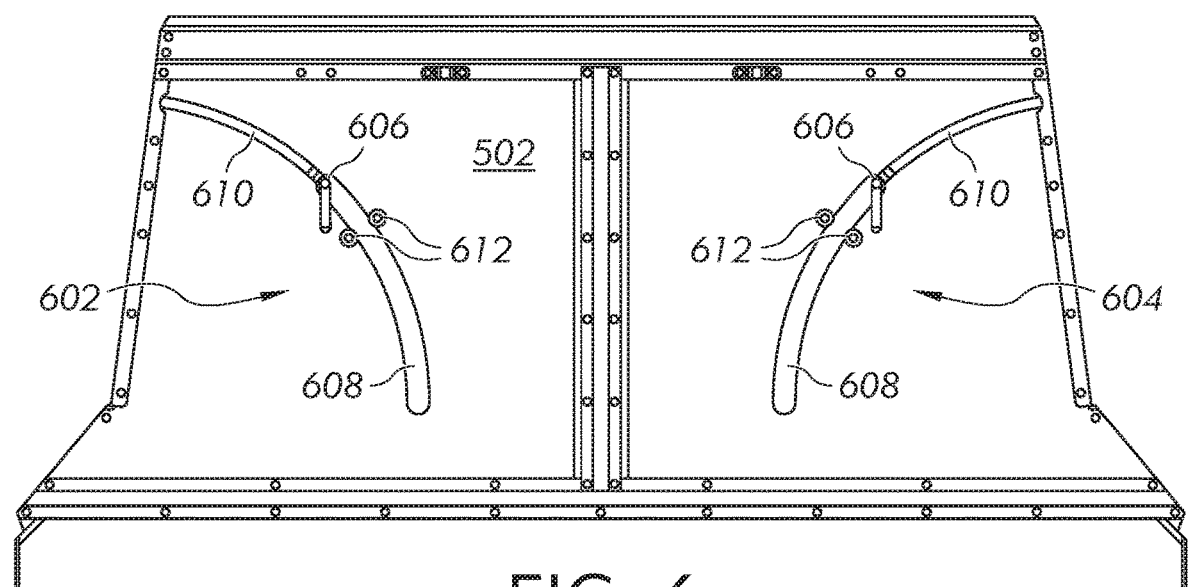
FIG. 6 is a top view of the forming shield assembly of FIG. 5.
Figure 7:
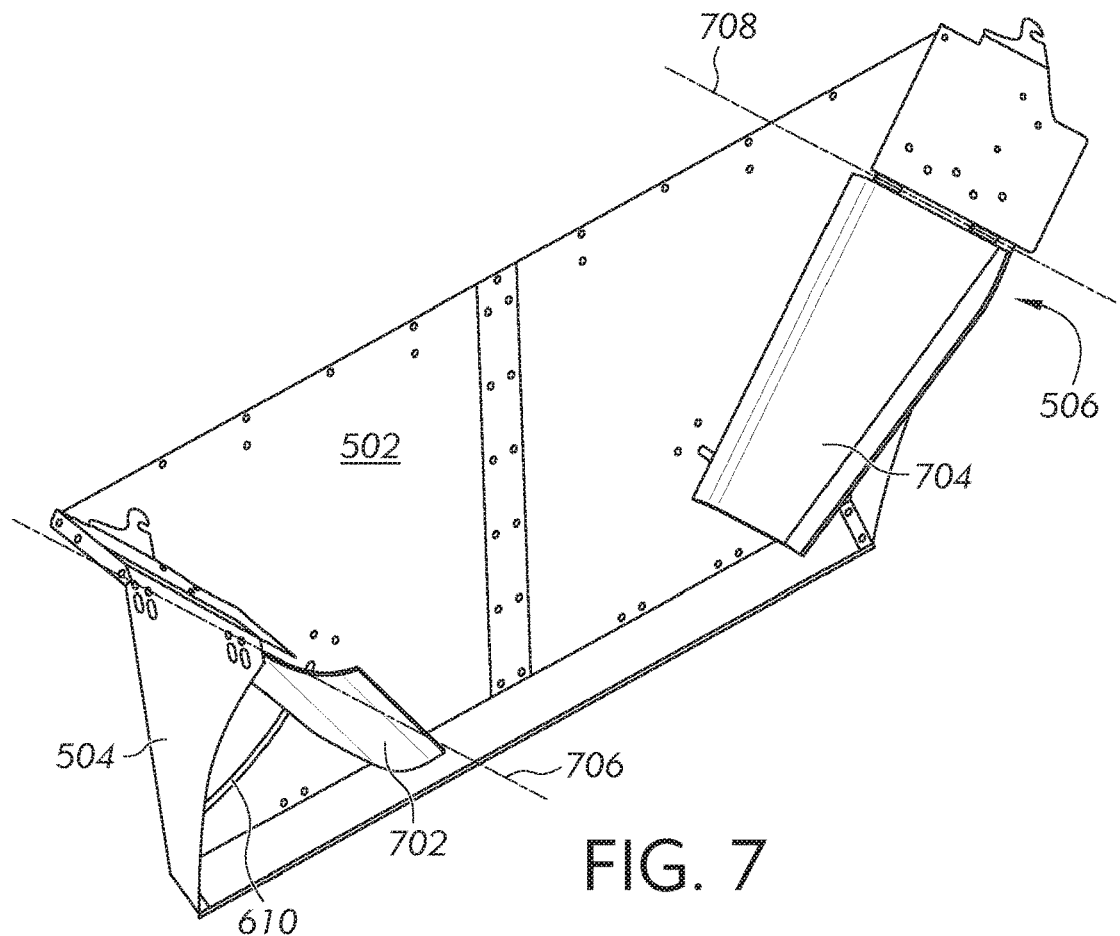
FIG. 7 is a bottom perspective view of the forming shield assembly of FIG. 5.

A first and second forming shield guide 602, 604 are illustrated more clearly in FIG. 6. The forming shield guides 602, 604 may have a clamping coupler 606 positioned through a blocking plate 608, the top plate 502, and into a corresponding forming shield 702, 704 (FIG. 7). The clamping coupler 606 may be positioned through an arc-shaped cutout 610 of the top plate 502. The clamping coupler 606 may be loosened by a user to slide the clamping coupler 606 along the arc-shaped cutout 610 to a desired location therein, thereby adjusting the angle of the corresponding forming shield 702, 704 relative to the respective first or second side 504, 506. Once the user has achieved the desired angle of the forming shield 702, 704, the clamping coupler 606 may be tightened by the user to ensure the forming shield 702 remains properly positioned.

The blocking plate 608 may have substantially the same arc-shape as the arc-shaped cutout 610. More specifically, the blocking plate 608 may extend from the clamping coupler 606 away from respective first or second side 504, 506 and have an arc length about as long as the arc-shaped cutout 610. The blocking plate 608 extends away from the clamping coupler 606 to pass through guides or sliders 612 located on either side of the arc-shaped cutout 610. The sliders 612 ensure the blocking plate 608 remains aligned with the arc-shaped cutout 610 and keep the blocking plate 608 in close proximity to the top plate 502. In one embodiment, the sliders 612 may have a bushing with an expanded head, wherein the blocking plate 608 may slide along the bushings but be restricted from moving substantially away from the top plate 502 due to the expanded head. In other embodiments, a single U-shaped coupler may be positioned over the blocking plate 608 for the same reason.

The blocking plate 608 may substantially block any crop from exiting through the arc-shaped cutout 610 regardless of the orientation of the forming shield guide 602. In other words, if the forming shield guide 602 is positioned along the first side 504, the blocking plate 608 will substantially cover the arc-shaped cutout 610, minimizing the amount of cut crop that may pass through the arc-shaped cutout 610.

Figure 8:
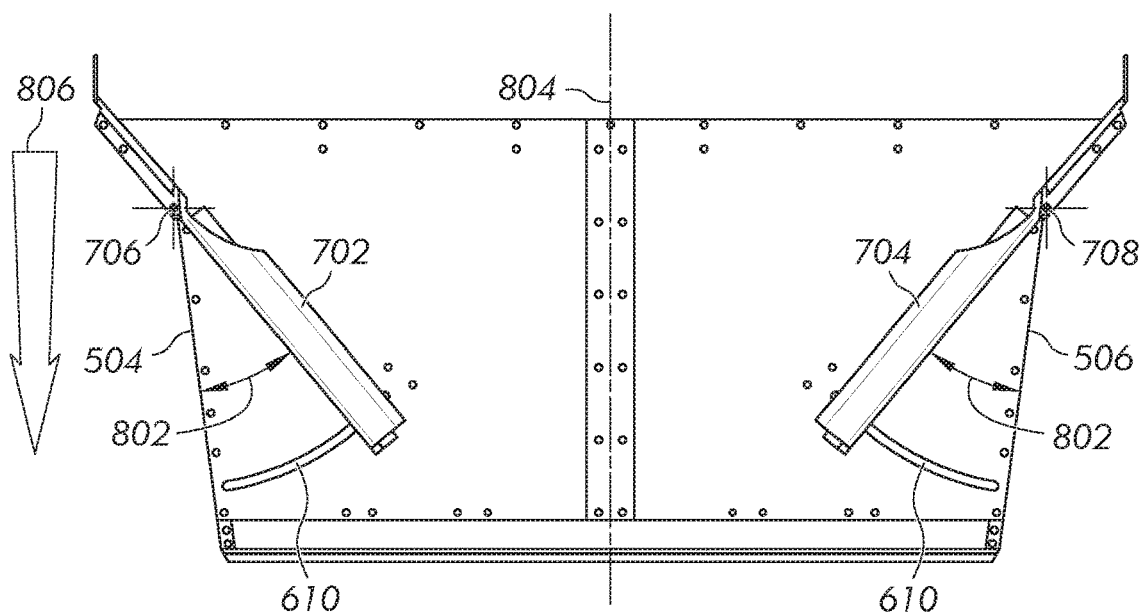
FIG. 8 is a bottom view of the forming shield assembly of FIG. 5.

Now referring to FIGS. 7-8, the underside of the forming shield assembly 130 is illustrated. More specifically the first and second forming shields 702, 704 are shown pivotally coupled to the respective first and second sides 504, 506 of the forming shield assembly 130. The forming shields 702, 704 are pivotally coupled to the sides 504, 506 about a respective first and second forming shield axis 706, 708. The forming shield axes 706, 708 may be concentric with an arc axis of the respective arc-shaped cutout 610. In this embodiment, the clamping couplers 606 may be loosened sufficiently to allow the forming shields 702, 704 to be pivoted about the respective forming shield axis 706, 708 as the clamping coupler 606 slides along the arc-shaped cutout 610. Accordingly, the length of the arc-shaped cutout 610 defines a maximum and minimum angle 802 of the forming shields 702, 704 relative to the corresponding side 504, 506.

FIG. 8 illustrates the forming shields 702, 704 at a maximum angle 802. In other words, in FIG. 8 the forming shields 702, 704 are illustrated coupled to the arc-shaped cutouts 610 at a location angularly away from the respective first and second side 504, 506. In this configuration, the forming shields 702, 704 will force any cut crop inwardly towards a central axis 804 as it is moved in a rearward direction 806. A narrow windrow will be generated when the forming shields 702, 704 are positioned as illustrated in FIG. 8.

In another embodiment not particularly shown here, the user may adjust the clamping couplers 606 and pivot the forming shields 702, 704 towards their respective sides 504, 506, to alter the angle 802 there between. In one nonexclusive example, the user may pivot the forming shields 702, 704 to be substantially adjacent to their respective sides 504, 506. That is to say, the forming shields 702, 704 may be pivoted about their respective forming shield axis 706, 708 within the arc-shaped cutout 610 until the angle 802 is substantially zero. In this configuration the resulting windrow may be wider than the resulting windrow when the forming shields 702, 704 are in the configuration described above for FIG. 8.

In yet another embodiment not particularly shown, the angle 802 of the first forming shield 702 may be different than the angle 802 of the second forming shield 704. In this configuration, the resulting windrow may be biased towards one side of the central axis 804. While several specific orientations of the forming shields 702, 704 are shown and described herein, this application is not limited to any particular orientation. Further, while the arc-shaped cutouts 610 and forming shields 702, 704 are shown to be specific sizes, this application also considers utilizing longer or shorter forming shields 702, 704 or arc-shaped cutouts 610 to further control the resulting windrow.

Figure 9:
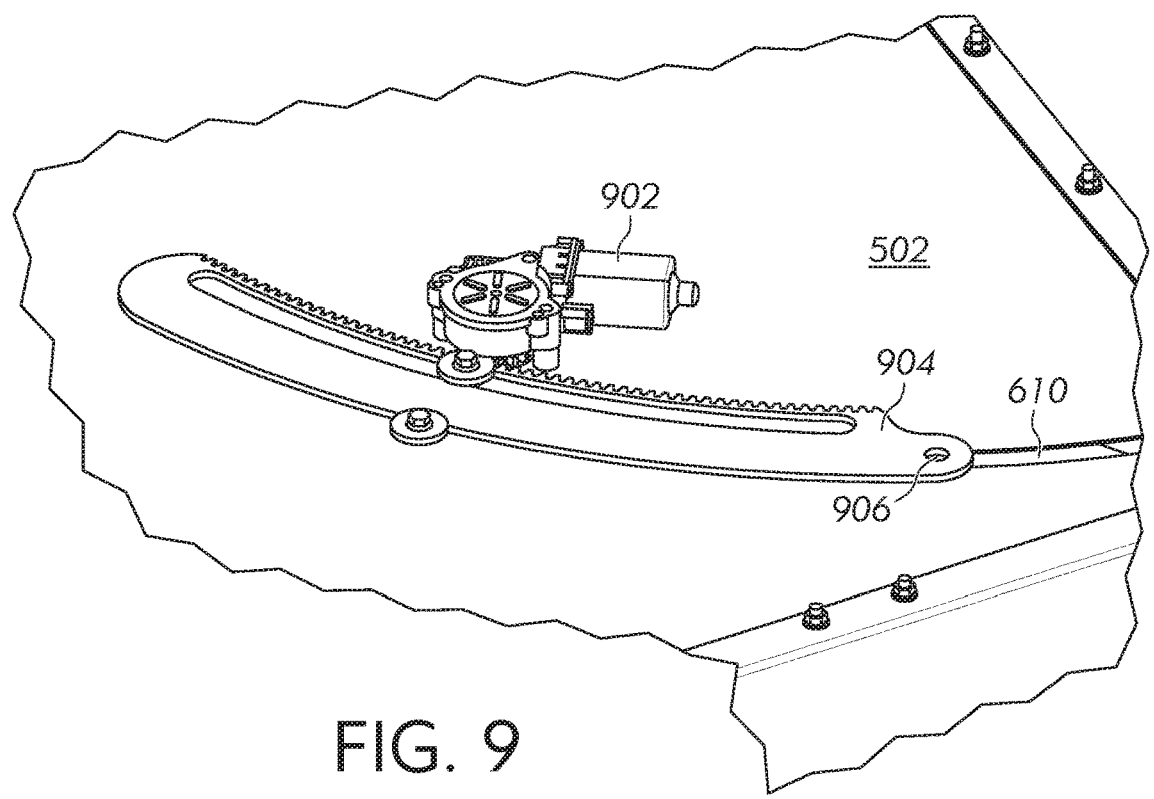
FIG. 9 is a partial view of another embodiment of a forming shield assembly.
Figure 10:
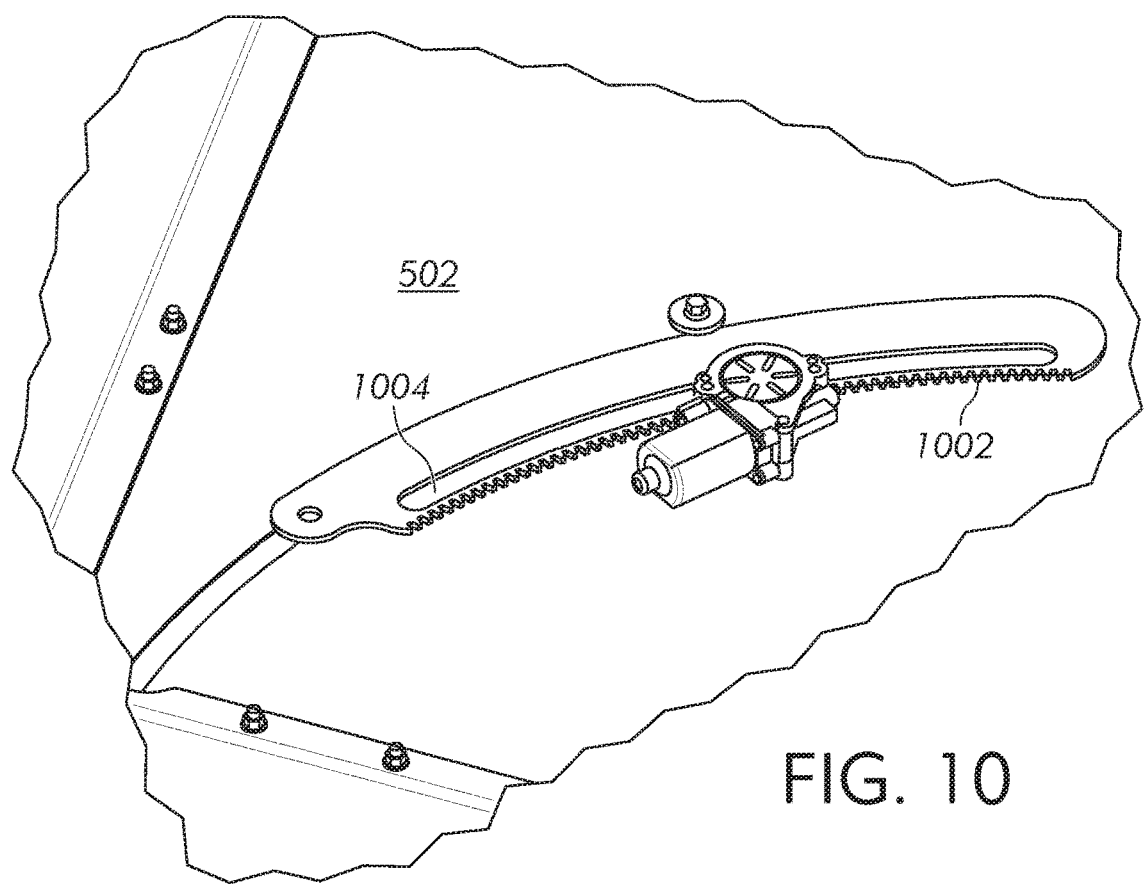
FIG. 10 is a partial view of the forming shield assembly of FIG. 9.
Figure 11:
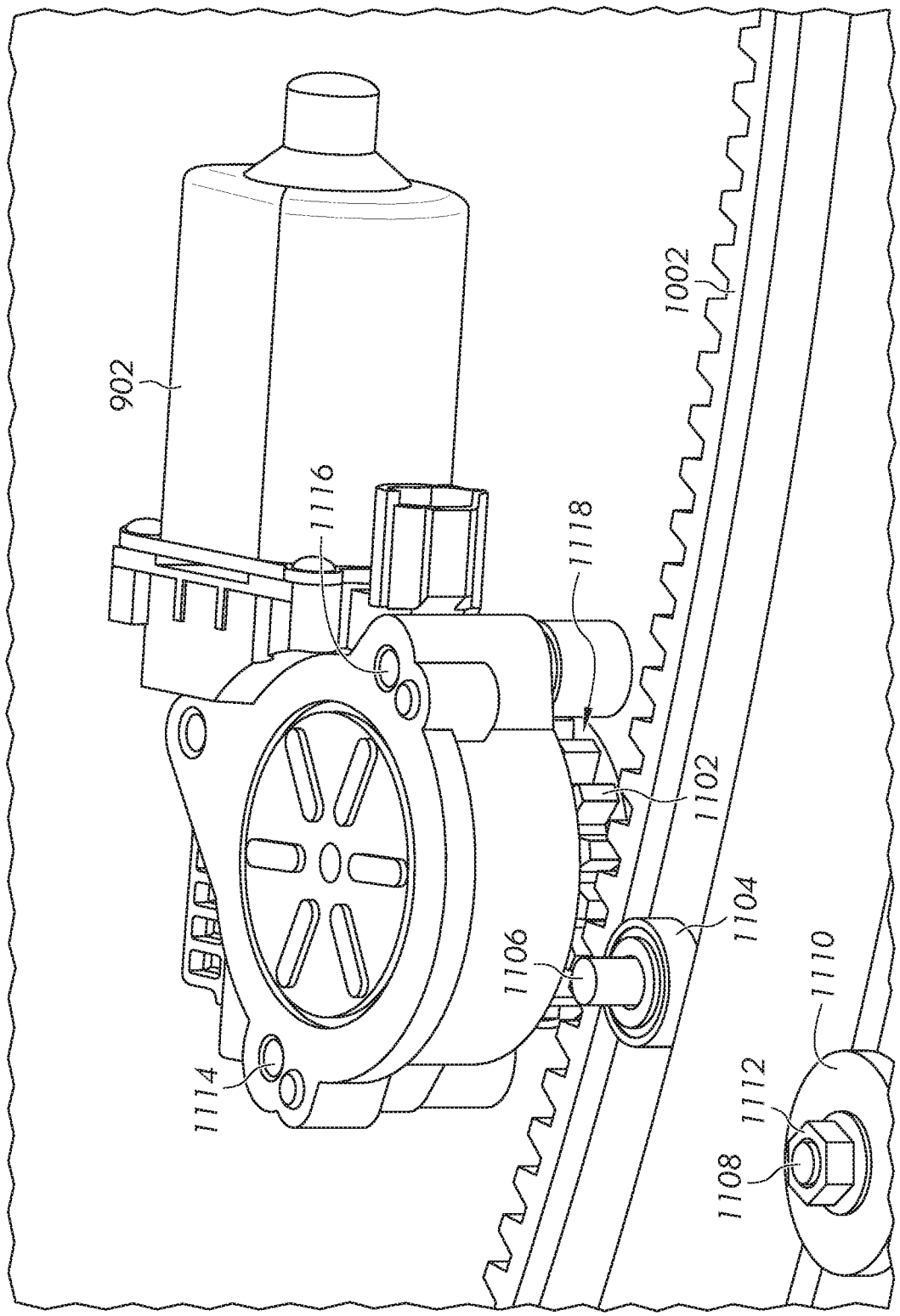
FIG. 11 is an enlarged partial view of the forming shield assembly of FIG. 9.

Referring now to FIGS. 9-11, one side of another embodiment of a forming shield assembly 130 is shown. While only one side of the forming shield assembly 130 is shown and described in FIGS. 9-11, the teachings of this disclosure are applicable to the other side of the forming shield assembly 130 as well, and this disclosure is not limited to only the one side described.

In this embodiment, the angle 802 of the forming shields 702, 704 may be controlled by a motor 902. The motor may be any type of motor known in the art, and this disclosure considers the motor to include any type of device that can initiate movement. In one non-exclusive example, the motor may be an electric rotary motor that is selectively coupled to an electric supply to rotate an output shaft. In another embodiment, the motor may be an actuator that is selectively coupled to the electric supply to provide a linear displacement. In yet another embodiment, the motor may be a hydraulic or pneumatic cylinder that is selectively coupled to a fluid supply to execute a linear displacement. Accordingly, this disclosure considers a motor to incorporate any known mechanical device capable of a displacement.

More specifically, this embodiment may also have the arc-shaped cutout 610 described above but utilize a geared blocking plate 904 that corresponds with the motor 902 to change the angle 802 of the corresponding forming shield 702, 704. The geared blocking plate 904 may be coupled through the top plate 502 to the respective forming shield 702, 704 at a first end 906.

The geared blocking plate 904 may be coupled to the respective forming shield 702, 704 with a coupler that allows a sufficient gap between the geared blocking plate 904 and the respective forming shield 702, 704. In one embodiment, a cylindrical bushing may be positioned between the geared blocking plate 904 and the respective forming shield 702, 704 to ensure proper spacing between the two and to allow the geared blocking plate 904 to move easily along the arc-shaped cutout 610 when a force is applied thereto. In the embodiment utilizing the bushing, the bushing may be slightly thicker than the thickness of the top plate 502, ensuring that the top plate 502 is not clamped between the geared blocking plate 904 and the respective forming shield 702, 704 thereby preventing movement along the arc-shaped cutout 610. In other words, in one embodiment it is necessary to couple the geared blocking plate 904 to the respective forming shield 702, 704 in a way that allows the two components to slide along the arc-shaped cutout 610.

The bushing may be utilized with any coupling means to couple the geared blocking plate 904 to the respective forming shield 702, 704 and this disclosure is not limited to any particular one. More specifically, a nut and bolt type fastener may be used to secure the bushing between the two components among other types of fasteners. Further still, some embodiments may not utilize a bushing at all but rather have low friction washers positioned between the geared blocking plate 904 and the top plate 502 and the respective forming shield 702, 704 and the top plate 502. In the embodiment utilizing low friction washers, a fastener with a minimal clamping force may couple the geared blocking plate 904 to the respective forming shield 702, 704 to allow repositioning of the respective forming shield 702, 704 under minimal force acting on the geared blocking plate 904.

The geared blocking plate 904 may both block open portions of the arc-shaped cutout 610 as described above and provide a location for the motor 902 to engage and reposition the geared blocking plate 904. More specifically, along one edge of the geared blocking plate 904 is an arc-shaped rack gear 1002. The rack gear 1002 may have teeth formed therein that correspond with a pinion gear 1102 coupled to the motor 902. The rack gear 1002 and pinion gear 1102 may be positioned to engage one another when the motor 902 rotates the pinion gear 1102. In other words, the motor 902 may alter the angle 802 of the respective forming shield 702, 704 by rotating the pinion gear 1102 while engaged to the rack gear 1002, thereby moving the geared blocking plate 904 along the arc-shaped cutout 610.

The geared blocking plate 904 may have an arced slot 1004 defined therein. The arced slot 1004 may define an arc-shape that is substantially concentric with that of the arc-shaped cutout 610. Further, the arced slot 1004 may be sufficiently wide to allow a bushing or bearing 1104 to be positioned therein. A first and second coupler 1106, 1108 may be coupled to the top plate 502. The first coupler 1106 may be positioned within the arced slot 1004 and be sized to allow the bushing or bearing 1104 to be positioned there around. The second coupler 1108 is positioned on the side of the geared blocking plate 904 opposite the rack gear 1002. The first and second coupler 1106, 1108 may have an expanded washer 1110 or the like coupled to the top portion of the respective first and second coupler 1106, 1108. Further, in one embodiment a nut 1112 may maintain the position of the expanded washer 1110. Similar to the sliders 612 described above, the couplers 1106, 1108 may be sized to ensure that the geared blocking plate 904 remains close to the top plate 502 while still allowing the geared blocking plate 904 to slide along the arc-shaped cutout 610.

In the embodiment illustrated in FIG. 11, the first coupler 1106 also provides a coupling location for the bushing or bearing 1104 described above. The first coupler 1106 may be positioned at the opposite side of the rack gear 1002 relative to the pinion gear 1102, thereby sandwiching the rack gear 1002 against the pinion gear 1102 when the motor 902 is in a coupled position. In this configuration, the bushing or bearing 1104 may support the rack gear 1002 to reduce deflection from the pinion gear 1102, ensuring the teeth of the pinion gear 1102 remain in substantial contact with the teeth of the rack gear 1002 when coupled thereto.

In the embodiment illustrated in FIGS. 9-11, the motor 902 may control the angle 802 of the respective forming shield 702, 704 by rotating the pinion gear 1102 to move the rack gear 1002 and thereby the respective forming shield 702, 704. In this configuration, a user may selectively alter the angle 802 of the respective forming shield 702, 704 remotely via the controls 114 or any other means. Each forming shield 702, 704 may be controlled independently to allow the user to vary both windrow width and bias relative to the central axis 804.

In one embodiment, when the motor 902 is not being powered to alter the position of the geared blocking plate 904, the motor 902 may sufficiently lock the geared blocking plate 904 from moving. For example, the motor 902 may be powered to move the geared blocking plate 904 to a desired position and then maintain that position after power is no longer provided to the motor 902.

The motor 902 may be coupled to the top plate 502 with a first, second, and third coupler 1114, 1116, 1117. The couplers 1114, 1116, 1117 are spaced from the rack gear 1002 a predetermined distance to ensure that the pinion gear 1102 will properly mesh with the rack gear 1002 when the motor 902 is coupled to the top plate 502 via the couplers 1114, 1116, 1117. However, the couplers 1114, 1116, 1117 are also positioned to allow two of the couplers 1114, 1116, 1117 to be released and the motor 902 to pivot about the other coupler 1114, 1116, 1117 away from the rack gear 1002. In other words, if a user desired to manually move the geared blocking plate 904, the user may uncouple two of the couplers 1114, 1116, 1117 and pivot the pinion gear 1102 out of contact with the rack gear 1002, thereby allowing manual movement of the geared blocking plate 904 and in turn the corresponding forming shield 702, 704.

In one embodiment, the top plate 502 may have a cutout section 1118 positioned underneath the pinion gear 1102. The cutout section 1118 may allow the pinion gear 1102 to align with the rack gear 1003 without contacting the top plate 502. Further, the cutout section 1118 may be arc-shaped and concentric with the first coupler 1114. The arc-shaped cutout section 1118 may allow the motor 902 to pivot about the first coupler 1114 away from the rack gear 1002 when the second and third coupler 1116, 1117 are released. The arc-shaped cutout section 1118 also allows the pinion gear 1102 to rotate out of engagement with the rack gear 1002 without contacting the top plate 502. In short, the cutout section 1118 is sufficiently sized to allow the pinion gear 1102 to be aligned with, and pivoted away from, the rack gear 1002 without substantial interference with the top plate 502.

While the motor 902 is shown and described as pivoting about the first coupler 1114, this disclosure is not limited to such a configuration. Rather, the motor 902 may pivot about any of the couplers 1114, 1116, 1117 when the remaining couplers are removed. Further, the arc-shaped cutout section 1118 may be concentric with any of the couplers 1114, 1116, 1117 to minimize interference with the pinion gear 1102 as described above.

In another embodiment, the first end 906 may utilize the clamping coupler 606 to couple the geared blocking plate 904 to the respective forming shield 702, 704. The clamping coupler 606 may remain in an unclamped configuration when the motor 902 is controlling the position of the geared blocking plate 904 as described above. However, if the user transitions the motor 902 away from the rack gear 1002 to allow manual control, the clamping coupler may be transitioned to a clamped position once the desired orientation of the forming shields 702, 704 is achieved manually, thereby holding the forming shields 702, 704 in the desired orientation.

Figure 14:
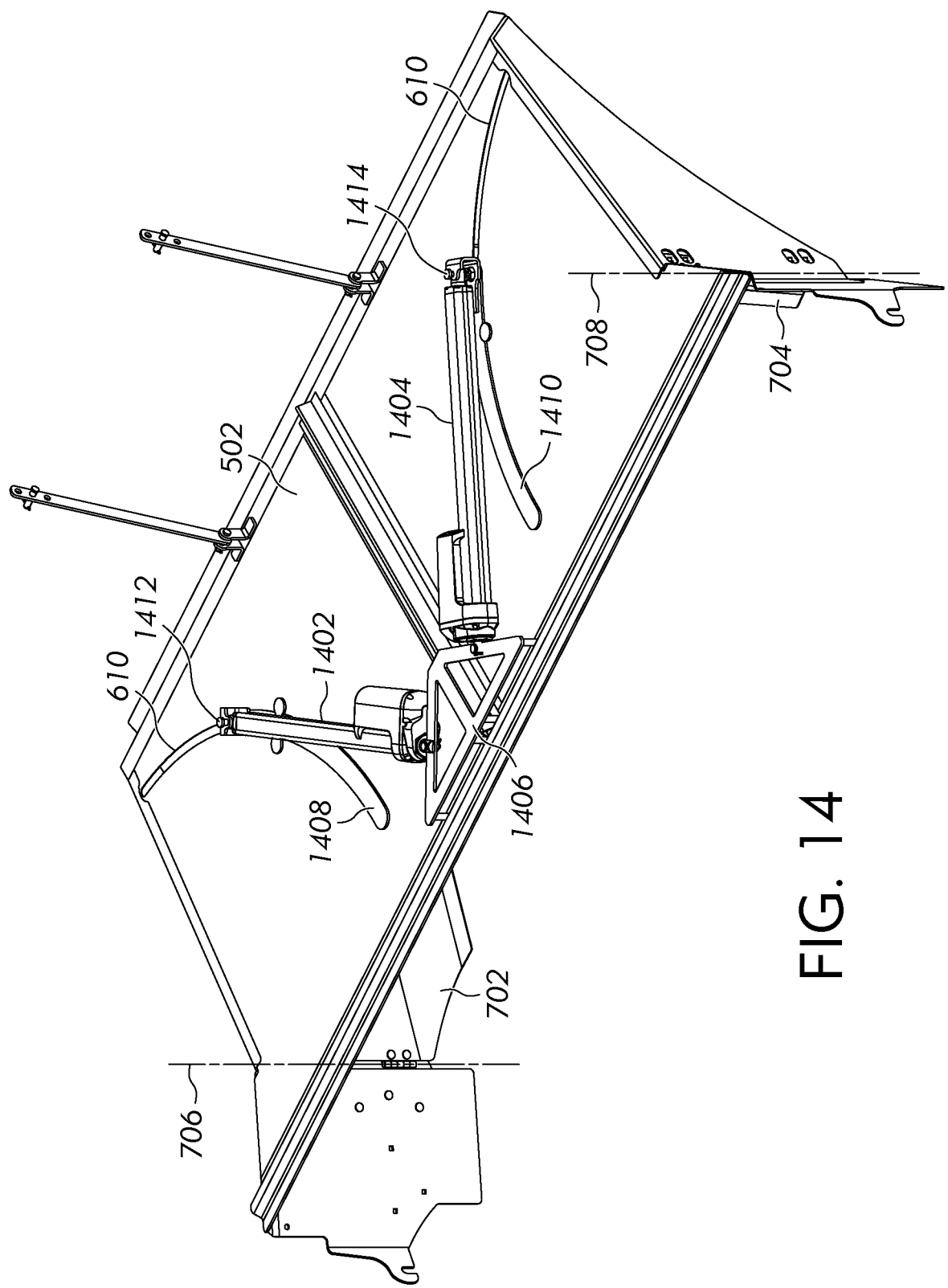
FIG. 14 is an elevated perspective view of the topside of another embodiment of a forming shield assembly.
Figure 15:
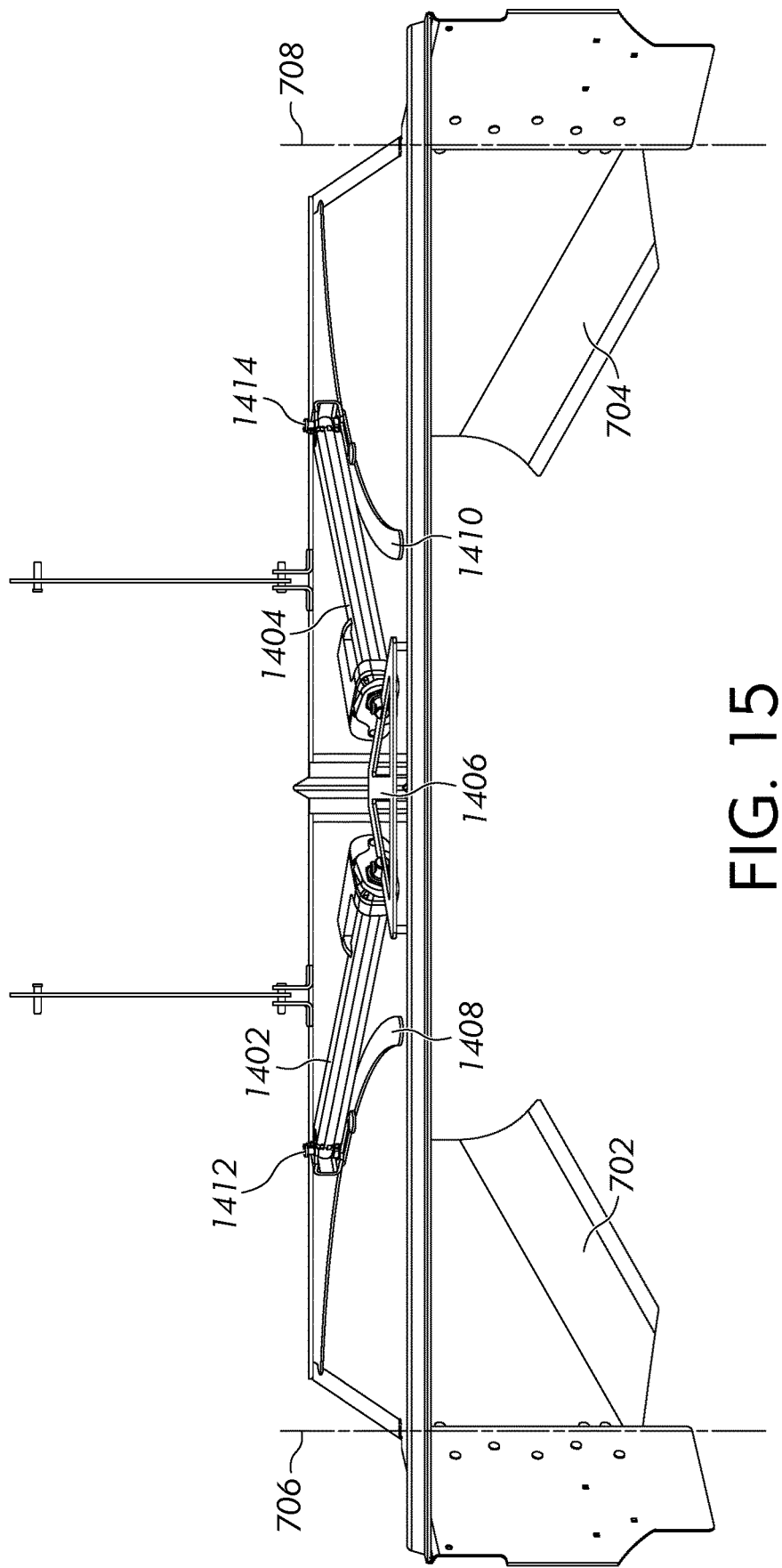
FIG. 15 is a rear view of the forming shield assembly of FIG. 14.
Figure 16:
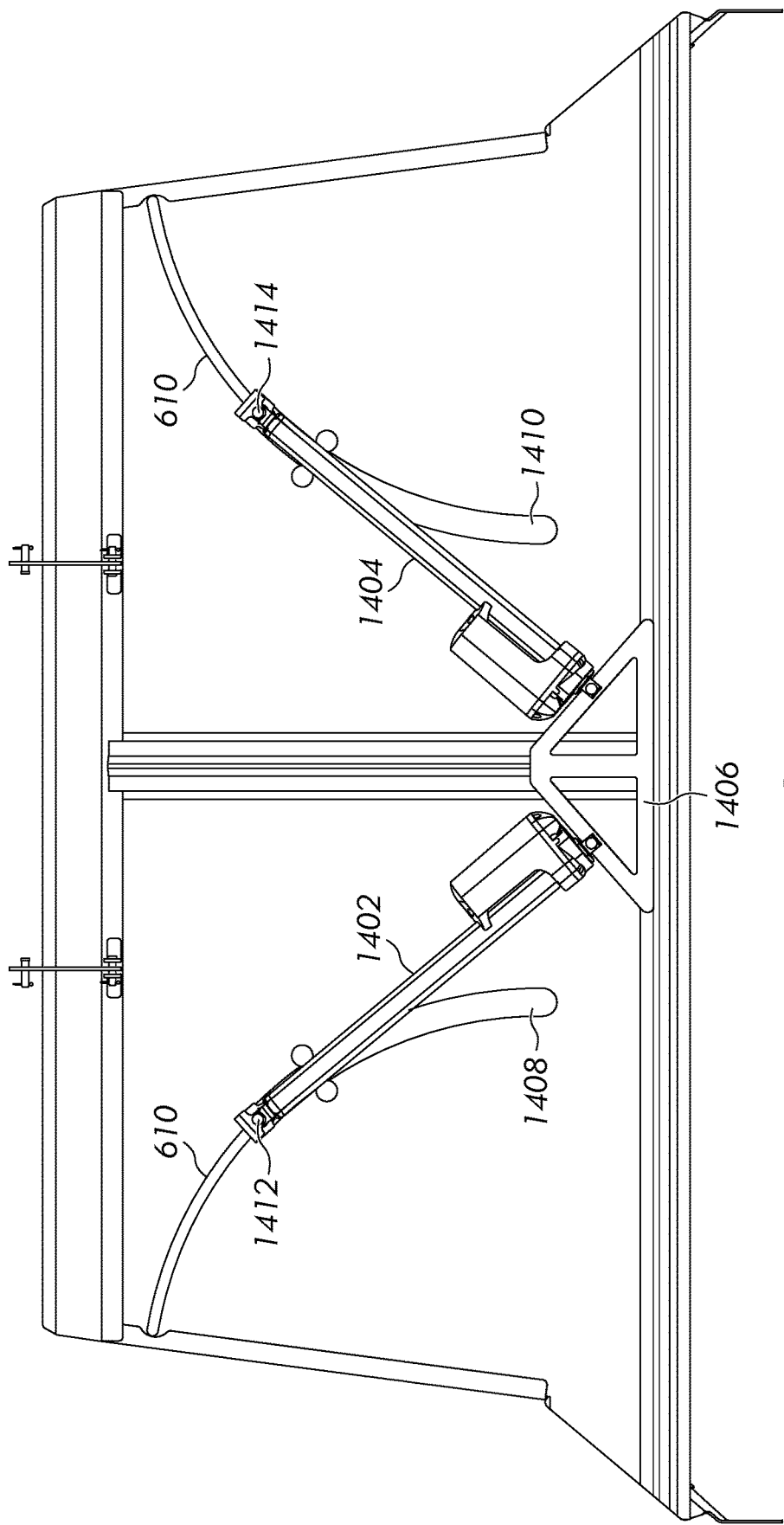
FIG. 16 is a top view of the forming shield assembly of FIG. 14.

In one embodiment, the motor 902 is a geared electric motor, but this disclosure is not limited to any specific type of motor. In the embodiment illustrated in FIGS. 14-16, the motor may be a first linear actuator 1402 and a second linear actuator 1404 that are coupled to a bracket 1406 on one end and to the corresponding forming shield 702, 704 on the other end. In one aspect of this embodiment, a first and second blocking plate 1408, 1410 may be coupled to the actuators 1402, 1404 to cover the arc-shaped cutouts 610 similar to those described in other embodiments above. More specifically, the first actuator 1402 may be pivotally coupled to the first blocking plate 1408 at a first end 1412. Similarly, the second actuator 1404 may be pivotally coupled to the second blocking plate 1410 at a second end 1414.

In one aspect of this disclosure, the first and second ends 1412, 1414 may be removably coupled to the corresponding actuator 1402, 1404. In one embodiment, the first and second ends 1412, 1414 may have a removable coupler positioned thereon that allows the ends 1412, 1414 to be removed from the forming shields 702, 704. In one aspect of this embodiment, the ends 1412, 1414 may be removed when the actuators 1402, 1404 are no longer powered. In this situation, the user may manually move the forming shields 702, 704 by uncoupling the actuators 1402, 1404 at the ends 1412, 1414 and moving the forming shields 702, 704. Further, the removable coupler in this embodiment may be the clamping coupler 606. The user may uncoupled the ends

1412, 1414 of the actuators 1402, 1404 and manually move the forming shields 702, 704 to a desired location. Once the forming shields are in the desired location, the clamping couplers 606 may be manipulated by the user to provide a clamping force against the top plate 502, thereby holding the forming shields 702, 704 in the orientation desired by the user.

In one aspect of this embodiment, the linear actuators 1402, 1404 may have one end pivotally coupled to the top plate 502 and another end pivotally coupled to a bracket on the blocking plate 1408, 1410. A user or other control system could alter the length of the linear actuator 1402, 1404 thereby altering the position of the corresponding forming shield 702, 704. The linear actuator 1402, 1404 may be electric, hydraulic, or pneumatic. A person skilled in the relevant art understands the many different types of linear actuators or other motors that may be suitable for the embodiments described herein and this disclosure is not limited to any particular one.

While the cutout 610 is shown and has been described as arc-shaped throughout this disclosure, this disclosure is not limited to such a configuration. Also considered herein are embodiments where the cutout 610 is substantially linear, or any other shape. Further, the forming shields 702, 704 may be coupled to the mower-conditioner 122 via linkages or the like, such as a four-bar linkage, wherein the orientation of the forming shields 702, 704 may be altered by a cutout path that is not arc-shaped. Accordingly, this disclosure contemplates altering the orientation of the forming shields along paths that are not arc-shaped as well.

One embodiment may include a controller (not shown) that communicates with and controls the motor 902. Further, one or more sensor (not shown) may communicate with the controller to establish the orientation of the forming shields. The controller may be the same controller used to control other systems of the tractor 102 or the mower-conditioner 122, or may be an independent controller altogether. Further, the controller may interact with the sensor or sensors to allow the user to remotely position the forming shields 702, 704 to a desired position utilizing the controls 114 of the tractor 102. For example, the user may be in the tractor 102 running the mower-conditioner 122 and determine a narrower windrow is preferred. The user may engage the controls 114 to indicate a narrower windrow is preferred and the controls may send a signal, through the controller, to power the motors 902 to increase the angle 802 of the forming shields 702, 704, thereby narrowing the resulting windrow. In yet another aspect of this embodiment, the sensors may identify the angle 802 of the forming shields 702, 704 and power the respective motors 902 to ensure the forming shields 702, 704 maintain the desired angle. Further still, the user may engage the controls to bias the windrow to one side or the other via the controller and the motors as described above.

In one embodiment, the forming shields 702, 704 may be positioned in the rearward direction 806 of a swath flap. That is to say, crop may be cut, conditioned, and directed towards the swath flap prior to engaging the forming shield assembly 130. Further still, the swath flap may be adjustable, either manually or via a motor or actuator, to affect the windrow size. Accordingly, in this embodiment the positioning of both the swath flap and the forming shields 702, 704 may affect the size of the resulting windrow. In the embodiment where the swath flap is adjustable via a motor or actuator, the controller may manipulate both the position of the forming shields 702, 704 and the position of the swath flap to create the desired windrow size and position.

Figure 12:
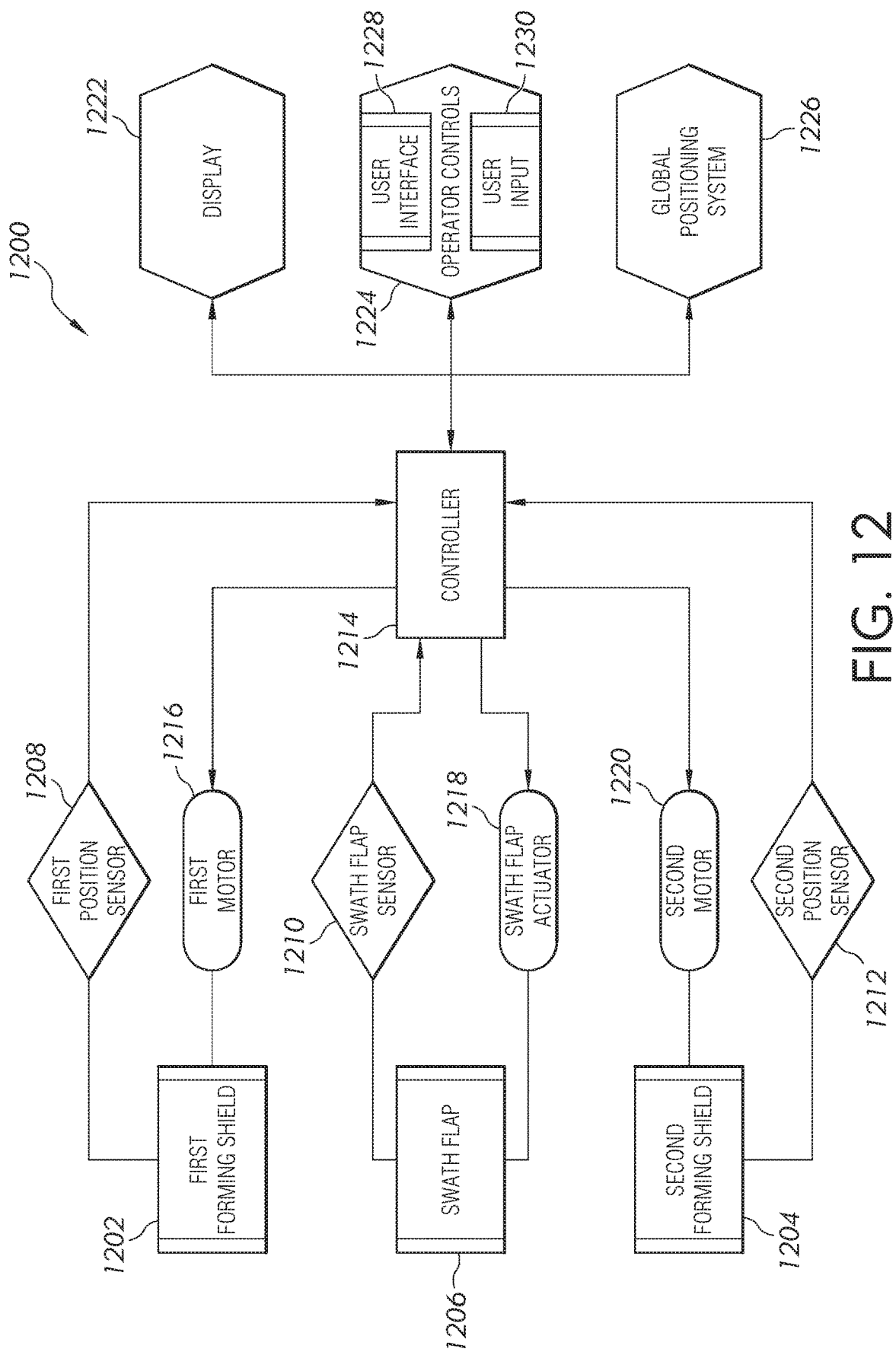
FIG. 12 is a schematic view of one embodiment of a crop forming shield system.

Referring now to FIG. 12, one example of a crop forming shield system 1200 is illustrated in schematic form. The system 1200 may have a first forming shield 1202 and a second forming shield 1204 similar to the first and second forming shield 702, 704 described above. The system 1200 may also have a swath flap 1206 that is adjustable to manipulate the cut crop. Each of the first forming shield 1202, second forming shield 1204, and swath flap 1206 may have a corresponding sensor 1208, 1210, 1212 positioned on the system 1200 to identify the orientation of the corresponding component 1202, 1204, 1206. More specifically, the first forming shield 1202 may have a first position sensor 1208 coupled thereto or otherwise positioned to identify the orientation of the first forming shield 1202 relative to a side of the forming shield assembly. Similarly, the second forming shield 1204 may have a second position sensor 1212 coupled thereto or otherwise positioned to identify the orientation of the second forming shield 1204 relative to a side of the forming shield assembly. Further, the swath flap 1206 may have a swath flap sensor 1210 coupled thereto or otherwise positioned to identify the orientation of the swath flap 1206 relative to a top side of the forming shield assembly.

Each of the sensors 1208, 1210, 1212 may communicate with a controller 1214. The sensors 1208, 1210, 1212 may communicate with the controller 1214 utilizing any known communication protocol and this disclosure is not limited to any one form of communication. More specifically, in one embodiment the sensors 1208, 1210, 1212 may send an electrical signal to the controller 1214 through a wire harness that electrically couples the sensors 1208, 1210, 1212 to the controller 1214. Alternatively, sensor values may be transmitted wirelessly from the sensors 1208, 1210, 1212 to the controller 1214. Regardless of the communication protocol, the sensors 1208, 1210, 1212 communicate with the controller 1214 to identify the position of the corresponding component 1202, 1204, 1206.

In another aspect of this disclosure, each of the components 1202, 1204, 1206 may be repositionable via a corresponding motor or actuator 1216, 1218, 1220. For example, the first forming shield 1202 may be coupled to a first motor 1216. The first motor 1216 may be similar to the motor 902 shown and described with reference to FIGS. 9-11. Further, the first motor 1216 may be coupled to the first forming shield 1202 via a pinion gear, rack gear, and blocking plate similar to those described with reference to FIGS. 9-11.

The second forming shield 1204 may be coupled to a second motor 1220. The second motor 1220 may be similar to the motor 902 shown and described with reference to FIGS. 9-11. Further, the second motor 1220 may be coupled to the second forming shield 1204 via a pinion gear, rack gear, and blocking plate similar to those described with reference to FIGS. 9-11.

The swath flap 1206 may also be coupled to a flap actuator 1218 or motor. The flap actuator 1218 may provide mechanism for adjusting the angular displacement of the swath flap 1206 relative to the top plate 502. The flap actuator 1218 may be an electric, pneumatic, or hydraulic actuator that can be displaced linearly. The swath flap 1206 may be pivotally coupled to the top plate 502 or other portion of the mower-conditioner assembly at a flap axis. The flap actuator 1218 may be coupled to the swath flap 1206 on one end and to the top plate 502 on the other. As the flap actuator 1218 changes length, the angle between the swath flap 1206 and the top plate 502 may be altered.

Each of the first motor 1216, flap actuator 1218, and second motor 1220 may be in communication with the controller 1214. More specifically, the controller 1214 may selectively provide power to, or otherwise instruct power to be supplied to, the motor or actuator 1216, 1218, 1220. The controller 1214 may selectively provide power to any of the motors or actuators 1216, 1218, 1220 to reposition the corresponding components 1202, 1204, 1206. Further still, the controller 1214 may simultaneously monitor the sensors 1208, 1210, 1220 as the controller 1214 engages the motors or actuators 1216, 1218, 1220 to ensure the components 1202, 1204, 1206 become oriented as desired.

In one aspect of this disclosure, the controller 1214 may also be in communication with a display 1222, operator controls 1224, and a Global Positioning System (hereinafter "GPS") 1226. The display 1222 may show information regarding the orientation of the first forming shield 1202, second forming shield 1204, and swath flap 1206. The display may show numerical values regarding the orientation of these components 1202, 1204, 1206 such as the angular offset or it may display a pictorial representation of the orientation of the components 1202, 1204, 1206. Regardless of the form, the display 1222 may provide the user with a representation of the component 1202, 1204, 1206 orientation.

The operator controls 1224 may have a user interface 1224 and a user input 1230. The user interface 1228 may be the same as the display 1222 or it may be an entirely separate therefrom. In one embodiment, the display 1222 is a touchscreen user interface 1228. The operator controls 1224 may also include one or more user inputs 1230. The user inputs 1230 may be toggle switches, buttons, and graphics on the user interface 1224 or the like. The user inputs 1230 may further indicate to the controller 1214 when the user desires to change the orientation of the components 1202, 1204, 1206. More specifically, the user input 1230 may communicate to the controller 1214 when the user wants to change the windrow size and location by modifying the orientation of the components 1202, 1204, 1206.

While the operator controls is described as having a user interface 1228 and a user input 1230 and being separate from the display 1222, in contemplated embodiments the user interface 1228, display 1222, and user input 1230 may all be substantially the same component. More specifically, a single touch screen or the like may provide all of the features described above for the display 1222 and operator controls 1224. More specifically, the display 1222 may provide simulated buttons thereon as part of the user interface 1228. Further, the display 1222 may identify when the simulated buttons of the display are selected and thereby utilize the simulated buttons as a user input 1230. Accordingly, this disclosure is not limited to any particular type of display or operator controls and considers different embodiments herein.

The controller 1214 may also communicate with the GPS 1226. The GPS 1226 may communicate a geographic location to the controller 1214 based on location data obtained from satellites or the like. Further, while GPS is described herein, any form of geographic locating is appropriate and considered herein. More specifically, a local mapping system may be utilized instead of GPS. Accordingly, this disclosure is not limited to utilizing a GPS for identifying geographic location.

Figure 13:
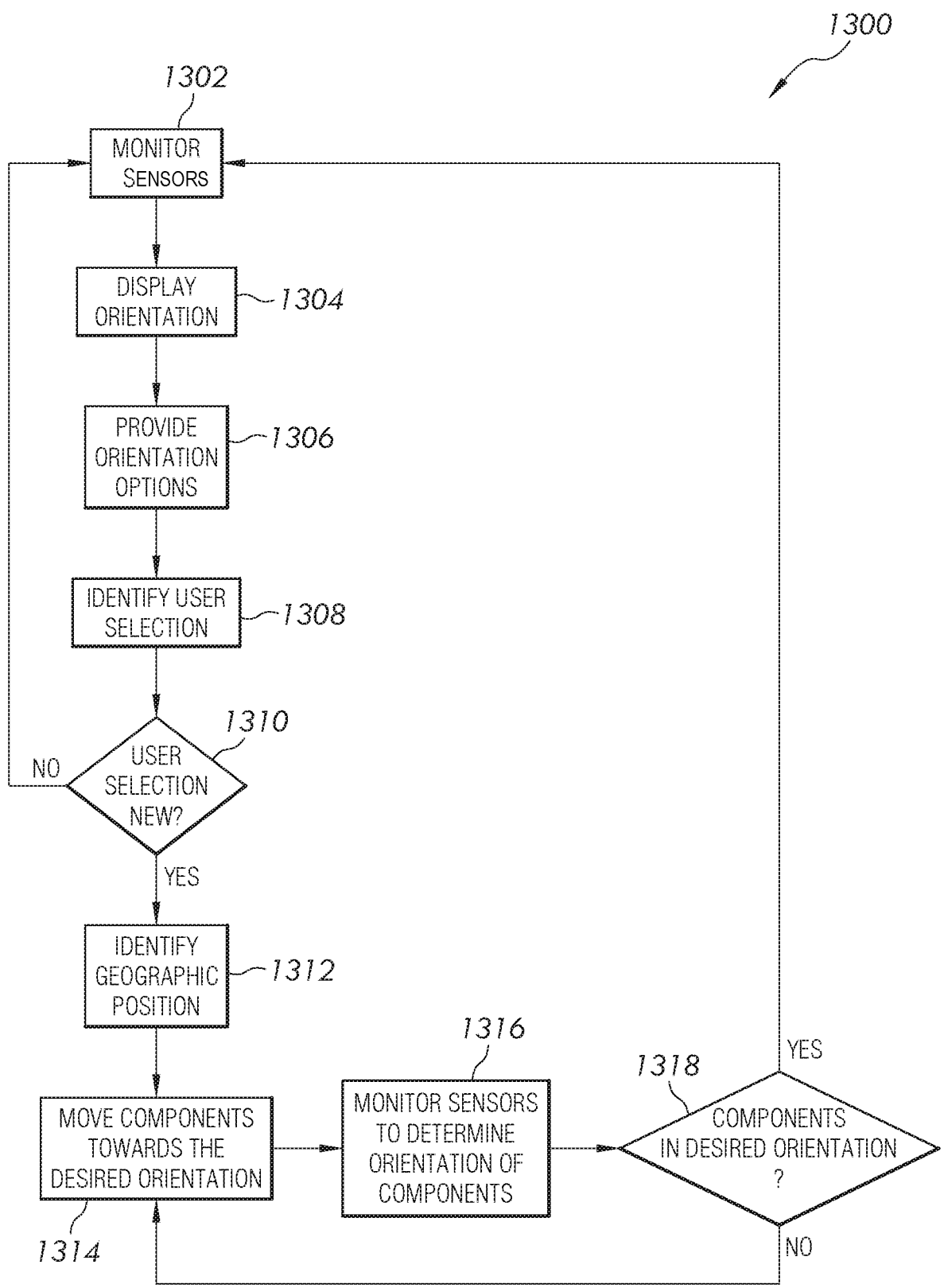
FIG. 13 is a flowchart of one embodiment of a logic system for the crop forming shield system of FIG. 12.

Referring now to FIG. 13, a logic flowchart 1300 is illustrated utilizing the crop forming shield system 1200. In box 1302, the controller 1214 may communicate with the sensors 1208, 1210, 1212 to identify the location of the corresponding components 1202, 1204, 1206. Box 1302 may be performed any time the tractor 102 is in a running configuration or it may only be performed when one of the user inputs 1230 indicates the user would like to monitor the sensors 1208, 1210, 1212. In other embodiments, box 1302 may be initiated when the GPS 1226 or other system of the tractor 102 identifies movement. Accordingly, this disclosure is not limited to any particular initiation mechanism for box 1302.

In box 1304, the display 1222 may show the orientation of the components 1202, 1204, 1206 based on the values identified in box 1302. More specifically, the display 1222 may show a pictorial representation of the orientation of the first forming shield 1202, second forming shield 1204, and swath flap 1206. Alternatively, the display 1222 may show a pictorial representation of the size and location of a resulting windrow based on the monitored sensor values from box 1302. Further still, the display orientation box 1304 may show the angular offset of the components 1202, 1204, 1206 relative to a fixed portion of the forming shield assembly 130. Many different forms are contemplated herein for displaying the orientation of the components 1202, 1204, 1206.

In box 1306 the user interface 1228 may provide several orientation options for the components 1202, 1204, 1206. More specifically, specific orientation options may be preset into a memory unit of the controller 1214. The controller 1214 may display the specific orientation options via the user interface 1228 and provide a user input 1230 for each of the specific orientation options. As one non-exclusive example, table 1 below illustrates some non-exclusive examples of specific orientation options. More specifically, the forming shields 1202, 1204 may have at least a wide setting where the corresponding forming shield 1202, 1204 is positioned substantially adjacent to the corresponding side 504, 506 and a narrow setting where the corresponding forming shield 1202, 1204 is pivoted angularly away from the corresponding side 504, 506. When both forming shields 1202, 1204 are in the wide configuration, the resulting windrow may be wider than when the forming shields 1202, 1204 are in the narrow configuration. Further, when one of the forming shields 1202, 1204 is in the wide configuration, and the other of the forming shields 1202, 1204 is in the narrow configuration, the resulting windrow may be biased towards the forming shield 1202, 1204 in the wide configuration.

Similarly, the swath flap 1206 may have at least a high and a low orientation. The orientation of the swath flap 1206, in conjunction with the orientation of the forming shields 1202, 1204 may provide resulting windows with substantially different location and size characteristics.

TABLE 1

| | First Forming Shield | Swath Flap | Second Forming Shield |
| --- | --- | --- | --- |
| Option 1 | Wide | High | Wide |
| Option 2 | Narrow | High | Wide |
| Option 3 | Narrow | High | Narrow |
| Option 4 | Wide | High | Narrow |
| Option 5 | Wide | Low | Wide |
| Option 6 | Narrow | Low | Wide |
| Option 7 | Narrow | Low | Narrow |
| Option 8 | Wide | Low | Narrow |

In Table 1, eight exemplary options are shown. However, this disclosure is not limited to only those options and they have been included herein only as an example of potential orientation options that could be included in box 1306. In one non-limiting example, the user may desire a wide windrow and thereby select Option 1 from Table 1. Alternatively, the user may desire a narrow windrow and select Option 7. Further still, the user may desire the windrow to be offset towards the first forming shield 1202 and select Options 4 or 8. Alternatively, the user may desire the resulting windrow be offset towards the second forming shield 1204 and select Options 2 or 6.

While several options are shown and described herein, this disclosure is not limited to any particular number of options. Further, while only wide, narrow, high, and low orientations are specifically mentioned herein, a person skilled in the art understands any number of positions could be stored in the memory of the controller 1214 as an option. Further still, the user may utilize the user input 1230 to alter the orientation of the components 1202, 1204, 1206 and store that particular orientation in the controller 1214 as an option. Accordingly, this disclosure is not limited to any particular number of options or orientation of the components 1202, 1204, 1206.

The controller 1214 may identify which of the orientation options was selected by the user in box 1308. As described above, box 1308 may include identifying which option was selected via the user input 1230. In one non-exclusive example, the user may select the desired option on a touchscreen display 1222. The desired option would then be communicated to the controller 1214. Alternatively, buttons or the like may be utilized to indicate the desired option. Accordingly, this disclosure contemplates many different ways to identify a user selection.

Next, the controller 1214 may consider whether the option selected by the user results in an orientation of the components 1202, 1204, 1206 that is different than the existing orientation in box 1310. As one non-limiting example, if the user selects Option 3 in box 1310, but the system 1200 is already in the Option 3 orientation, the controller 1214 may identify that the user selection is not new, and return to box 1302.

However, if the controller 1214 identifies a user selection that is different than the current orientation of the components 1202, 1204, 1206, the controller 1214 may identify the geographic position of the system 1200 via the GPS 1226 in box 1312. The controller 1214 may store the GPS coordinates identified by the GPS 1226 in the controller 1214 and associate the particular GPS coordinates with the option selected by the user at that particular location.

In box 1314, the controller 1214 may utilize the sensors 1208, 1210, 1212 and motors or actuators 1216, 1218, 1220 to move the components 1202, 1204, 1206 to the desired orientations based on the user selection of box 1310. Once the controller 1214 moves the components 1202, 1204, 1206 to the desired orientation, the controller 1214 may continue to monitor the sensors 1208, 1210, 1212, in box 1316 to ensure the components 1202, 1204, 1206 remain orientated as desired by the user. Finally, in box 1318 the controller 1214 may determine whether the components 1202, 1204, 1206 have moved from the desired orientation. If the components 1202, 1204, 1206 have moved from the desired orientation, the controller 1214 may repeat box 1314 to move the components towards the desired orientation. However, if the components 1202, 1204, 1206 are in the desired orientation, the controller 1214 may loop back to box 1302 and continue executing the control logic 1300.

While one detailed example of control logic 1300 is shown and described herein, this disclosure is not limited to the precise logic described. In other embodiments, there may be no box 1312 where location of the user selection is recorded. Further still, there may be no display orientation box 1304. Instead the user may select a desired orientation without a visual representation of the current orientation of the components 1202, 1204, 1206.

In one aspect of the embodiment of FIG. 13, the geographic position 1312 may be identified and stored in the memory unit of the controller 1214 each time the user selects a different orientation. Further, the selected orientation may be associated with the geographic location. In this embodiment, the user may record the orientation options of the components 1202, 1204, 1206 selected as a particular field is worked. When the user returns to work the field, the particular orientation of the components 1202, 1204, 1206 may automatically be adjusted with the controller 1214 when the GPS 1226 identifies locations that were previously recorded. Accordingly, as the user works a field that has a previously recorded orientation schedule, the controller 1214 will automatically adjust the position of the components 1202, 1204, 1206 to match the positions selected by the user in the corresponding geographic regions.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A crop forming assembly, comprising:
   a frame member;
   a cutout defined through a portion of the frame member;
   a forming shield pivotally coupled to the frame member;
   a blocking plate repositionable along the cutout; and
   a motor removably coupled to the frame member and configured to engage the forming shield;
   wherein, the motor engages the forming shield to reposition the forming shield along the cutout;
   further wherein, the blocking plate is repositioned along the cutout as the forming shield is repositioned.

2. The crop forming assembly of claim 1, further wherein the blocking plate is coupled to the forming shield through the cutout at a first end.

3. The crop forming assembly of claim 1, further comprising:
   a pinion gear coupled to the motor; and
   a rack gear coupled to the forming shield;
   wherein, teeth of the pinion gear mesh with the rack gear.

4. The crop forming assembly of claim 3, further comprising:
   a plurality of couplers that selectively couple the motor to the frame member;
   wherein, when more than one of the plurality of couplers are coupled to the frame member, the pinion gear at least partially contacts the rack gear;
   further wherein, when only one of the plurality of couplers are coupled to the crop frame member, the pinion gear of the motor is pivotable away from the rack gear.

5. The crop forming assembly of claim 1, further wherein the motor is a linear actuator coupled to the frame member on a first end and coupled to the forming shield on a second end.

6. The crop forming assembly of claim 1, further comprising:
   a clamping member coupled to the forming shield through the blocking plate and the slot and selectively coupled to the frame member;

wherein when the clamping member is clamped to the frame member, the forming shield and blocking plate are not repositionable.

7. The crop forming assembly of claim 1, further comprising:
a controller in communication with the motor; and
a user input that provides a desired position of the forming shield;
wherein the controller selectively repositions the forming shield with the motor to the desired position.

8. The crop forming assembly of claim 3, wherein the rack gear is formed from a portion of the blocking plate.

9. A crop forming shield system, comprising:
a first forming shield that is pivotal about a first forming shield axis;
a second forming shield that is pivotal about a second forming shield axis;
a first motor configured to selectively reposition the first forming shield;
a second motor configured to selectively reposition the second forming shield;
a swath flap selectably positioned by a swath flap actuator; and
a user control in communication with the first and second motor and the swath flap actuator;
wherein, the user control selectively engages the first and second motor and the swath flap actuator to reposition the corresponding forming shield and swath flap.

10. The crop forming shield system of claim 9, further wherein the first motor is a first linear actuator and the second motor is a second linear actuator.

11. The crop forming shield system of claim 9, further comprising:
a first rack gear coupled to the first forming shield;
a second rack gear coupled to the second forming shield;
a first pinion gear coupled to the first motor; and
a second pinion gear coupled to the second motor;
wherein, the first pinion gear selectively meshes with first rack gear and the second pinion gear selectively meshes with the second rack gear to reposition the corresponding first and second forming shield.

12. The crop forming shield system of claim 9, further comprising a controller, wherein the controller receives a user input from the user control and automatically repositions the first and second forming shield and swath flap actuator responsive to the user input.

13. The crop forming shield system of claim 10, further comprising:
a first arc-shaped cutout defined through a plate, the first arc-shaped cutout being concentric with the first forming shield axis;
a first arced blocking plate positioned adjacent to the first arc-shaped cutout;
a second arc-shaped cutout defined through the plate, the second arc-shaped cutout being concentric with the second forming shield axis; and
a second arced blocking plate positioned adjacent to the second arc-shaped cutout.

14. The crop forming assembly of claim 11, further comprising:
a plurality of couplers that selectively couple each of the first motor and the second motor to a top plate;
wherein, when either of the first or second motor are coupled to the top plate with more than one of the plurality of couplers, the corresponding first or second pinion gear at least partially contacts the corresponding first or second rack gear;
further wherein, when either of the first or second motors are coupled to the top plate with only one of the plurality of couplers, the corresponding first or second pinion gear is pivotable away from the corresponding first or second rack gear.

15. A method for controlling the shape characteristics and location of a windrow, comprising:
providing a first forming shield, a first motor, a swath flap, swath flap actuator, and user controls;
selectively coupling the first motor to the first forming shield; and
altering an angular position of the first forming shield and the swath flap responsive to a change in the user controls.

16. The method of claim 15, further comprising:
providing a sensor coupled to the crop forming assembly and configured to identify an orientation of the first forming shield;
providing a controller in communication with the user controls and the sensor;
wherein, the user controls indicate a desired position of the first forming shield to the controller;
further wherein, the controller engages the first motor to reposition the first forming shield until the sensor indicates the first forming shield is in the desired position.

17. The method of claim 16, further comprising:
providing a second forming shield and a second motor;
selectively coupling the second motor to the second forming shield; and
altering an angular position of the second forming shield responsive to a change in the user controls.

18. The method of claim 15 further wherein the first motor is selectively coupled to the first forming shield with a clamping member, further wherein the clamping member has a clamped position that maintains the angular position of the forming shield and a loose position that does not maintain the angular position of the forming shield.

19. The method of claim 18, further wherein when the first motor is not coupled to the first forming shield and the clamping member is in the loose position, the angular position of the forming shield is adjustable.

20. The method of claim 15, further comprising communicating a geographic location to a controller and selectively altering at least one of the swath flap or the first forming shield with the controller based on the geographic location.

* * * * *